United States Patent
Ruz Martínez et al.

(10) Patent No.: US 12,140,521 B2
(45) Date of Patent: Nov. 12, 2024

(54) METHOD AND SYSTEM FOR IDENTIFYING PARTICLES, BASED ON MULTIFREQUENCY MEASUREMENTS OF RESONATING PLATES

(71) Applicant: CONSEJO SUPERIOR DE INVESTIGACIONES CIENTÍFICAS (CSIC), Madrid (ES)

(72) Inventors: José Jaime Ruz Martínez, Madrid (ES); Óscar Malvar Vidal, Madrid (ES); Eduardo Gil-Santos, Madrid (ES); Montserrat Calleja Gómez, Madrid (ES); Francisco Javier Tamayo De Miguel, Madrid (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 606 days.

(21) Appl. No.: 17/427,331

(22) PCT Filed: Jan. 30, 2020

(86) PCT No.: PCT/ES2020/070072
§ 371 (c)(1),
(2) Date: Jul. 30, 2021

(87) PCT Pub. No.: WO2020/157364
PCT Pub. Date: Aug. 6, 2020

(65) Prior Publication Data
US 2022/0136953 A1 May 5, 2022

(30) Foreign Application Priority Data
Jan. 31, 2019 (ES) .............................. ES201930073

(51) Int. Cl.
*G01N 15/10* (2024.01)

(52) U.S. Cl.
CPC ................................... *G01N 15/10* (2013.01)

(58) Field of Classification Search
CPC .... G01N 15/10; G01N 29/12; G01N 29/4427; G01N 2291/012; G01N 29/348;
(Continued)

(56) References Cited

U.S. PATENT DOCUMENTS

2006/0223171 A1  10/2006  Craighead et al.

FOREIGN PATENT DOCUMENTS

| WO | 03091458 A1 | 11/2003 |
| WO | 2004029625 A1 | 4/2004 |
| WO | 2006031072 A1 | 3/2006 |

OTHER PUBLICATIONS

O. Malvar et al., "Mass and stiffness spectrometry of nanoparticles and whole intact bacteria by multimode nanomechanical resonators", 1 Institute of Microelectronics of Madrid (IMM-CSIC), Isaac Newton 8 (PTM), Tres Cantos, 28760 Madrid, Spain. 2, 2016, 8 pages.*

(Continued)

*Primary Examiner* — Alexander Satanovsky
(74) *Attorney, Agent, or Firm* — Hayes Soloway PC (57) ABSTRACT

The disclosure relates to a method for identifying adsorbates deposited on resonance plates. The method includes (i) calculating a candidate mass and candidate position of the adsorbate, disregarding the effect of stiffness, from the measurement of the frequencies of the plate and prior knowledge of the mass of the plate; (ii) using the calculated values as a starting point for calculating the final values of the mass and position of the adsorbate and the different stiffness coefficients from the measurement of the frequencies of the plate; (iii) comparing the values of the candidate mass of the adsorbate and of the calculated coefficients with a set of previously stored reference values corresponding to (Continued)

a catalogue of known adsorbates; and (iv) identifying the adsorbate deposited on the plate as the adsorbate belonging to the catalogue that is most similar to the obtained values.

16 Claims, 4 Drawing Sheets

(58) Field of Classification Search
CPC ....... G01N 29/4472; G01N 2291/0256; G01N 2291/0426; G01N 2291/0427; G01N 29/022; G01N 29/036
See application file for complete search history.

(56) References Cited

OTHER PUBLICATIONS

Javier Tamayo et al., "Effect of the adsorbate stiffness on the resonance response of microcantilever sensors", Research Article | Applied Physics Letters 89, 224104, 2006.*

Murali K. Ghatkesar et al., "Real-Time Mass Sensing by Nanomechanical Resonators in Fluid", Conference at Vienna, Austria, Sensors, IEEE, 2004, pp. 1060-1063, https://ieeexplore.ieee.org/document/1426357.*

Eduardo Gil-Santos et al., "Nanomechanical Mass Sensing and stiffness spectrometry based on two-dimensional vibrations of resonant nanowires", Nature Nanotechnology • Sep. 2010.*

O. Malvar, "Mass and stiffness spectrometry of nanoparticles and whole intact bacteria by multimode nanomechanical resonators", Article, 2016, 1-8, Nature Communications.

Eduardo Gil-Santos, "Nanomechanical mass sensing and stiffness spectrometry based on two-dimensional vibrations of resonant nanowires", Article, 2010, 1-9, Nature Nanotechnology.

Javier Tamayo, "Effect of the adsorbate stiffness on the resonance response of microcantilever sensors", Journal, 2006, 1-3, vol. 89, Applied Physics Letters.

S. Dohn, "Mass and position determination of attached particles on cantilever based mass sensors", Journal, 2007, 1-4, vol. 78, Review of Scientific Instruments.

Eric Sage, "Neutral particle mass spectrometry with nanomechanical systems", Article, 2015, 1-5, Nature Communications.

B. Ilic, "Mechanical resonant immunospecific biological detector", Journal, 2000, 450-452, vol. 77, No. 3, Applied Physics Letters.

* cited by examiner

METHOD AND SYSTEM FOR IDENTIFYING PARTICLES, BASED ON MULTIFREQUENCY MEASUREMENTS OF RESONATING PLATES

CROSS-REFERENCE TO RELATED APPLICATIONS AND PRIORITY

This patent application claims priority from PCT Patent Application No. PCT/ES2020/070072 filed Jan. 30, 2020, which claims priority from Spanish Patent Application No. P201930073 filed Jan. 31, 2019. Each of these patent applications are herein incorporated by reference in their entirety.

FIELD OF THE INVENTION

The present invention is comprised in the technical field corresponding to technologies for the identification of micro- and nanometric size particles, by means of measurement and indirect characterization methods. More specifically, the invention relates to a method and to a system for identifying and classifying individual particles based on changes in the different resonance frequencies of thin plate type structures on which they are deposited. These changes in resonance frequencies of plates are caused by the adsorption of the particle to be detected on their surface.

BACKGROUND OF THE INVENTION

The resistance that a given body offers against strain depends on different factors, primarily its Young's modulus, as well as the form and type of strain experienced. This fact suggests the possibility of studying and identifying individual particles by straining them in different ways and observing the resistance they offer against the strain exerted. The information that is obtained about the particle when it is strained can be extremely valuable on certain scales, such as the nanometric scale. For example, the stiffness of biological organisms, such as viruses, is known to vary according to the organisms' state of maturation. Some studies indicate that the cancerous and metastatic cells are softer than healthy cells, which helps them to migrate to other parts of the body more readily. Furthermore, the stiffness of human immunodeficiency virus is known to decrease during the maturation process as an infection activation mechanism. These are some examples of the importance of stiffness in biological entities, but of course there are many more.

In this context, the detection and identification of species has currently become a very active field in multiple areas of research, such as chemistry, biology, or the environmental sciences, as well as in medicine, safety, and health. Over the past decades, mass spectrometry (MS) has become more popular and is now clearly the main tool for the identification of species in a sample. Therefore, as a consequence of the potential of this technique, a number of MS variants have been developed to meet different needs, and at present, the number of MS applications is higher than ever and continues to grow.

The mass spectrometers need to fragment and ionize large molecular sets into other smaller sets which are subsequently detected, with information about the mass-charge ratio of each individual fragment being obtained. The result is a of mass/charge spectrum that can be analyzed and compared with a database in order to know the composition of the original sample and allow its identification. MS has a very high resolution and is highly efficient for species with relatively small masses. However, measuring large particles constitutes a real challenge for this technique because said particles may acquire very different states of charge, widening the peaks of the obtained spectrum and making it very complex and, therefore, difficult to interpret. Furthermore, the detectors commonly used in this field, such as microchannel plates, have low high mass ion detection efficiencies. In this sense, nanoelectromechanical systems (NEMS) have recently been proposed as a new mass spectrometry variant which overcomes the problem of measuring large particles. The NEMS-based sensors have been developed and studied for decades and have been proposed in the literature with many different forms and applications, demonstrating their potential as ultrasensitive mass sensors with unprecedented mass resolution. The main operating principle of NEMS as mass sensors is that every time a particle is deposited on their surface, its resonance frequencies are modified by an amount which is proportional to the mass of the analyte. This effect is completely independent of the state of charge of the particle, which makes NEMS-based MS very suitable for measuring particles with a neutral charge, such as viruses or bacterial cells close to their native state, given that a strong ionization could cause important changes in their biological structure. Another advantage of this technique is that the results are much easier to interpret, since they directly measure the mass of the particles and not the mass-charge spectrum.

In addition to mass, it has been demonstrated that NEMS can also be used to obtain information about the stiffness of the analyte related to its internal structure and its composition. It is evident that this fact will improve the potential of NEMS-based MS because the possibility of extracting two orthogonal coordinates (mass and stiffness) will considerably improve the distinction capacity of detection systems based on this technique. In this sense, some cantilever type resonators have already been used as detectors of the nanomechanical mass and stiffness spectrometry (MS-NS), which have been used to successfully measure the Young's modulus of E. coli bacteria, for example.

As mentioned, information about the stiffness of the analyte is very useful and clearly represents a potential improvement for known MS techniques. In this field, the most widely used techniques for studying the stiffness of a sample is atomic force microscopy. However, this technique is tedious, since it consumes a great deal of time and is quite invasive. Therefore, in the field of the invention the need to develop new methods that allow nanometric size particles to be strained in a controllable, reliable, rapid, and non-invasive manner, extracting all the possible information about said strain for purposes of identification and characterization of the mentioned particles is currently being considered.

The present invention provides a solution to said need by means of a novel method for the identification of particles based on the change in frequency of different vibration modes of a plate due to the stiffness of the adsorbed particle. The method is completely valid for any plate geometry and for any vibration mode, in or out of the plane, and opens up the door to new applications in spectrometry of biological entities, as well as to the identification of nanoparticles with excellent precision. The invention therefore proposes a general technique for the precise identification of particles based on changes in frequency of the different vibration modes of plates due to the mass and the stiffness of the adsorbed particle. Furthermore, the technique can be used very effectively, even for distinguishing particles with the same mass and Young's modulus, but with a different shape, therefore providing a powerful new tool for the study of the stiffness of individual biological entities, as well as for the precise identification of particles in nanomechanical spectrometry.

BRIEF DESCRIPTION OF THE INVENTION

As described in the preceding section, a first object of the present invention relates to a method for identifying an adsorbate (an expression that will be used hereinafter to denote any particle or substance to be identified) of mass $M_a$ deposited on a plate of mass $M_p$, wherein said plate comprises a set of vibration modes, and wherein, for said modes, the corresponding resonance frequency $f_0$ thereof is displaced by a certain amount $\Delta f$ upon depositing the adsorbate in an adsorption position $(x_0, y_0)$ thereof.

Advantageously, said method comprises the next steps:
calculating a candidate mass and candidate position of the adsorbate from the measurement of the change in frequency of a plurality of vibration modes of the plate and prior knowledge of the mass of the plate $M_p$. In this first step, the effect of the stiffness is preferably disregarded, such that the change $\Delta f$ is determined as follows:

$$\frac{\Delta f}{f_0} = -\frac{1}{2}\frac{M_a}{M_p}(\hat{u}(x_0, y_0)^2 + \hat{v}(x_0, y_0)^2 + \hat{w}(x_0, y_0)^2);$$

wherein $\hat{u}$ and $\hat{v}$ are dimensionless displacements along a system of in-plane axes of the plate, and $\hat{w}$ is the dimensionless displacement along the axis perpendicular to the plane of the plate;

using the calculated values as a starting point for calculating the final values of the mass $M'_a$, position of the adsorbate and the various stiffness coefficients $\gamma'$ dependent on the mechanical properties and geometry of the adsorbate and on the geometry of the plate from the measurement of the change in frequency of several vibration modes of the plate (in this case stiffness is not disregarded) and using the strain energy $U_a$ of the adsorbate based on the strain tensor in the adsorption position, $\varepsilon_{xx,yy,xy}(x_0,y_0)$, obtained from the displacement $(\hat{u}, \hat{v}, \hat{w})$ in-plane $(x, y)$ defined by the plate for a subset of resonant modes, as follows:

$U_a = \gamma'_x \varepsilon_{xx}(x_0, y_0)^2 + \gamma'_y \varepsilon_{yy}(x_0, y_0)^2 + \gamma'_{xxxy} \varepsilon_{xx}(x_0,y_0)\varepsilon_{yy}(x_0, y_0) + \gamma'_{xy}\varepsilon_{xy}(x_0,y_0)^2 + \gamma'_{xxxy}\varepsilon_{xx}(x_0,y_0)\varepsilon_{xy}(x_0,y_0) + \gamma'_{yyxy}\varepsilon_{yy}(x_0,y_0)\varepsilon_{xy}(x_0,y_0);$ comparing the values of the candidate mass of the adsorbate $M'_a$ and of the coefficients $\gamma'$ calculated in the preceding step with a set of reference values $\{M_a^D, (\gamma')^D\}$ which are calculated from the transformation to the reference system of the plate of previously stored values corresponding to a catalogue of known adsorbates deposited on the plate with a given orientation in a reference plane $(x', y')$;

identifying the adsorbate deposited on the plate as the adsorbate belonging to the catalogue the values $M'_a$ and $\gamma'$ of which are the most similar to the values $\{M_a^D, (\gamma')^D\}$.

A method which allows both the mass of the deposited adsorbate and its shape and orientation in three-dimensional space to be identified is thereby obtained, unlike other known techniques which only allow the mass and/or two-dimensional and therefore restricted projections of the shape of the mentioned adsorbate to be calculated. The present technique therefore allows to discriminate between particles which may have different sizes, but the projection of which is identical in a detection plane (for example, with current techniques, it would not be possible to distinguish the shape of a disc from the shape of a rectangular plate for the case of an elevation projection).

In a preferred embodiment of the method of the invention, the components $\gamma'$ measured in the reference system of the plate are related to the components $\gamma$ measured in the reference system of the adsorbate (which appear in the catalogue), which is rotated an angle $\theta$ about the z axis, by means of the expression:

$\gamma'_x = \gamma_x \cos^4\theta + \gamma_y \sin^4\theta + (\gamma_{xy} + \gamma_{xxyy})\cos^2\theta \sin^2\theta - \gamma_{xxxy}\cos^3\theta \sin\theta - \gamma_{yyxy}\sin^3\theta \cos\theta$ $\gamma'_y = \gamma_y \cos^4\theta + \gamma_x \sin^4\theta + (\gamma_{xy} + \gamma_{xxyy})\cos^2\theta \sin^2\theta + \gamma_{xxxy}\cos^3\theta \sin\theta + \gamma_{yyxy}\sin^3\theta \cos\theta$ $\gamma'_{xy} = (\gamma_{xy} + \gamma_{xxyy})\cos^2 2\theta + (\gamma_x + \gamma_y)\sin^2 2\theta - \gamma_{xxxy} + (\gamma_{xxxy} - \gamma_{yyxy})\cos^2 2\theta \sin^2 2\theta$ $\gamma'_{xxyy} = 1/2(\gamma_x + \gamma_y - \gamma_{xy} - \gamma_{xxyy})\sin^2 2\theta + \gamma_{xxyy} + 1/2(\gamma_{xxxy} - \gamma_{yyxy})\cos^2 2\theta \sin^2 2\theta$ $\gamma'_{xxxy} = (\gamma_x - \gamma_y + (\gamma_x + \gamma_y - \gamma_{xy} - \gamma_{xxyy})\cos 2\theta)\sin 2\theta + 1/2((\gamma_{xxxy} + \gamma_{yyxy})\cos 2\theta + (\gamma_{xxxy} - \gamma_{yyxy})\cos 4\theta)$ $\gamma'_{yyxy} = (\gamma_x - \gamma_y - (\gamma_x + \gamma_y - \gamma_{xy} - \gamma_{xxyy})\cos 2\theta)\sin 2\theta + 1/2((\gamma_{xxxy} + \gamma_{yyxy})\cos 2\theta - (\gamma_{xxxy} - \gamma_{yyxy})\cos 4\theta).$ In another preferred embodiment of the method of the invention, the resonant vibration modes comprise out-of-plane and/or in-plane vibration modes.

In another preferred embodiment of the method of the invention, only resonant vibration modes experiencing a negative change in frequency with the deposition of the adsorbate are selected.

In another preferred embodiment of the method of the invention wherein $N>2$ modes in total are measured, and M is the set of said modes with negative change in frequency, for calculating the adsorption position in the first step the following function is minimized:

$$F_0 = \sum_{m \in M} \left( \frac{\delta f_m}{\sqrt{\sum_{k \in M} \delta f_k^2}} - \frac{\Phi_m^1 \Delta^1}{\sqrt{\sum_{k \in M} (\Phi_k^1 \Delta^1)^2}} \right)^2,$$

wherein $\delta f_m$ is the displacement of the relative frequency of the experimentally measured m-th mode, and wherein:

$$\Phi_n = \left[ -d_n^2, \frac{\varepsilon_{xxn}^2}{2U_{pn}}, \frac{\varepsilon_{yyn}^2}{2U_{pn}}, \frac{\varepsilon_{xyn}^2}{2U_{pn}}, \frac{\varepsilon_{xxn}\varepsilon_{yyn}}{2U_{pn}}, \frac{\varepsilon_{xxn}\varepsilon_{xyn}}{2U_{pn}}, \frac{\varepsilon_{yyn}\varepsilon_{xyn}}{2U_{pn}} \right],$$

$$\Delta = \left[ 1, \frac{2M_p\gamma'_x}{M_a}, \frac{2M_p\gamma'_y}{M_a}, \frac{2M_p\gamma'_{xy}}{M_a}, \frac{2M_p\gamma'_{xxyy}}{M_a}, \frac{2M_p\gamma'_{xxxy}}{M_a}, \frac{2M_p\gamma'_{yyxy}}{M_a} \right],$$

$d_n^2 = \hat{u}_n(x_0, y_0)^2 + \hat{v}_n(x_0, y_0)^2 + \hat{w}_n(x_0, y_0)^2$ is the square of the total displacement of the plate, and values $(x_0, y_0) \in \Omega$ minimizing function $F_0(x, y)$ are the first estimation of the adsorption position.

In another preferred embodiment of the method of the invention, the comparison of the values of the candidate mass of the adsorbate $M'_a$ and of the coefficients $\gamma'$ with the set of reference values $\{M_a^D, (\gamma')^D\}$ is calculated by means of the similarity estimator $I(\theta)$:

$$I(\theta) = \sum_{n=1}^{N} \text{abs}(\Phi_n^1)(M_a^D - M_a)^2 + \sum_{i=2}^{7} \sum_{n=1}^{N} \text{abs}(\Phi_n^i)\left((\gamma_i')^D - \frac{M_a}{2M_p}\Delta^i\right)^2,$$

wherein superscript D refers to the values of the catalogue of adsorbates. Value $\theta$ minimizing $I(\theta)$ is the most likely value of the orientation of the adsorbate.

In another preferred embodiment of the method of the invention, the adsorbates are inorganic particles, viruses, bacteria, proteins and/or cells.

A second object of the invention relates to a system for identifying an adsorbate of mass $M_a$ deposited on a plate of mass $M_p$, wherein said plate comprises a plurality of vibration modes and wherein, for each of said modes, the corresponding resonance frequency $f_0$ thereof is displaced by an amount $\Delta f$ based on the displacement $(\hat{u}, \hat{v}, \hat{w})$ of the plate in the corresponding vibration mode upon depositing the adsorbate in a adsorption position $(x_0, y_0)$ thereof, wherein said system comprises:

one or more plates;
deposition means for depositing one or more adsorbates on the plates (for example, said means may comprise one or more vacuum chambers and an ionization and/or electrospray system, in charge of spraying the samples on the plates); and
measurement means for measuring the displacement of the resonance frequency when the adsorbate is deposited on one of the plates, for a plurality of vibration modes thereof (for example, said means may comprise piezoelectric materials for performing frequency scanning and/or one or more phase-locked loops, or PLLs; and one or more lasers focused on the plates and configured for emitting a beam thereon, which is received by a photodetector and subsequently amplified for reading same).

Advantageously, said system comprises software and hardware means for recording and processing data, configured for reading the data generated by the measurement means and for storing a set of reference values $\{M_a, \gamma\}$, corresponding to a catalogue of known adsorbates deposited on the plate with a given orientation in a reference plane (x', y'), the software and hardware means being further configured for performing a method for identifying adsorbates according to any of the embodiments described herein.

In a preferred embodiment of the system of the invention, said system comprises a mass spectrometer.

A third object of the invention relates to a computer program incorporating a plurality of steps of a method according to any of the embodiments herein, which can be implemented through the software and hardware means for recording and processing data of a system according to any of the embodiments described herein.

The objects of the present invention also relate to the methods, systems, and software program described in the claims of the present application.

DETAILED DESCRIPTION OF THE INVENTION

Figure 1:
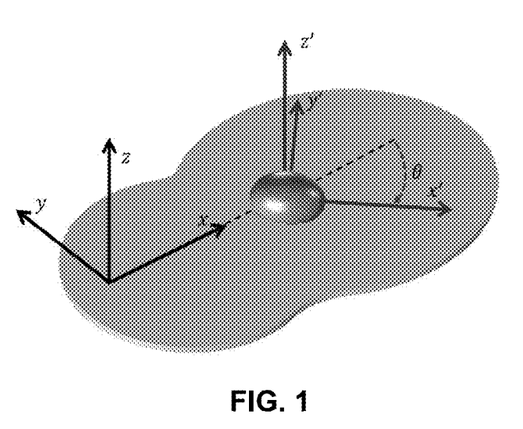
FIG. 1 shows a diagram of a plate with an adsorbate in the upper part. The reference system of the plate is represented as (x, y, z) and the reference system of the adsorbate is represented as (x', y', z'). This latter reference system is rotated by an angle $\theta$ with respect to the first reference system.

As described in the section corresponding to the background of the invention, a plate having an arbitrary geometry can vibrate with very different modes and frequencies. When classifying these vibrations into different categories, a distinction is usually made between "out-of-plane" vibrations and "in-plane" vibrations. Out-of-plane vibrations are those vibrations for which the main displacement takes place perpendicular to the plane of the plate, and wherein displacements of another type are disregarded. Moreover, when the main displacements occur in the same plane as the plate, this is referred to as an in-plane vibration mode. The bending and torsional modes of cantilever type plates are examples of out-of-plane modes, whereas radial breathing modes of disc type plates are examples of in-plane vibration modes. Generally, and as shown in FIG. 1, it is possible to define a coordinate system in which directions x and y are in the plane of the plate and direction z is perpendicular to the plane of the plate. In this system, the displacement of each point of the plate in directions x, y and z can be described by a set of functions u(x,y), v(x,y) and w(x,y), respectively. For out-of-plane modes, u(x,y) and v(x,y) are much smaller than w(x,y), where these can be disregarded, whereas for in-plane modes, w(x,y) is much smaller than u(x,y) and v(x,y), where this can be disregarded. The frequencies and forms of vibration modes of the plate depend on its geometry and on its mechanical properties. Likewise, for a given vibration mode, the frequency corresponding to said mode can be obtained using the Rayleigh-Ritz method, which basically establishes that the mean kinetic energy per oscillation cycle must be equal to the mean strain energy per oscillation cycle. Whatever the nature of the oscillation, when a small particle is adsorbed on the surface of the plate, two different effects arise:

(i) the total mass of the system increases and, therefore, the frequency must decrease in order to keep the mean kinetic energy per oscillation cycle constant; and (ii) since the particle is in contact with the surface of the plate, it is strained together with the plate and, therefore, increases the mean strain energy per oscillation cycle. To maintain correct equilibrium between mean kinetic and strain energies, the frequency of the system must increase accordingly. In other words, the mass of the particle causes the frequency to decrease, and the stiffness of the particle causes the frequency to increase.

Taking these effects into account and assuming that the size of the particle is much smaller than the size of the resonator, the change in relative frequency can be expressed as:

$$\frac{\Delta f}{f_0} = -\frac{1}{2}\left(\frac{T_a}{T_p} - \frac{U_a}{U_p}\right), \tag{Eq. 1}$$

wherein T is the mean kinetic energy per oscillation cycle, U is the mean strain energy per oscillation cycle and the subscripts p and a correspond to the plate and adsorbate, respectively. The effect of the mass of particles on resonance frequencies of the plate corresponds to the kinetic energy part of Equation 1.

The kinetic energy $T_p$ of the plate can be expressed as:

$$T_p = 1/2 A_n^2 \omega_n^2 M_p, \tag{Eq. 2}$$

wherein M is the mass, $\omega_n$ is the angular vibration frequency of the plate and $A_n$ is an arbitrary amplitude. Assuming that the particle is much smaller than the plate, the displacement along the particle can be considered constant; therefore, the kinetic energy of the adsorbate can be expressed as:

$$T_a = 1/2 A_n^2 \omega_n^2 M_a (\hat{u}(x_0, y_0)^2 + \hat{v}(x_0, y_0)^2 + \hat{w}(x_0, y_0)^2), \tag{Eq. 3}$$

wherein $\hat{u}$, $\hat{v}$ and $\hat{w}$ are the non-dimensional displacement of the corresponding vibration mode and $(x_0, y_0)$ are the coordinates of the adsorption position on the plate. Using Equation 1, the effect of mass of the adsorbate on resonance frequency of the plate can ultimately be expressed as:

$$\frac{\Delta f}{f_0} = -\frac{1}{2}\frac{M_a}{M_p}(\hat{u}(x_0, y_0)^2 + \hat{v}(x_0, y_0)^2 + \hat{w}(x_0, y_0)^2). \tag{Eq. 4}$$

The strain of the plate when it is vibrating is transferred to the adsorbate that is deposited on its surface. The contact surface between the adsorbate and the plate plays a crucial role in strain transmission. Strain involves a spatial variation of the displacements and, therefore, a contact area which is, for example, very narrow at x, barely being able to transfer strain in said direction x, because the displacements are constant for all practical purposes in such a narrow space. This means that for a contact surface that is perpendicular to direction z, none of the components z of the strain will be transferred to the adsorbate. Given the state of in-plane strain of the plate in the adsorption position $\varepsilon_{xx}(x_0, y_0)$, $\varepsilon_{yy}(x_0, y_0)$ and $\varepsilon_{xy}(x_0, y_0)$, the final state of strain in the adsorbate will be proportional only to these three amounts. The proportionality constants will depend on the geometry of the adsorbate and also on the nature of the vibration mode. Since the thickness of the plate is considered small in comparison with its other dimensions, the mechanical state of the plate can be described with the plane stress approximation, and the mean strain energy of the plate can be expressed as:

$$U_p = \frac{1}{2}\frac{E_p}{(1-v_p^2)}\int_{V_p}((\varepsilon_{xx} + \varepsilon_{yy})^2 - 2(1-v)(\varepsilon_{xx}\varepsilon_{yy} - \varepsilon_{xy}^2))dV, \tag{Eq. 5}$$

wherein E and v are the Young's modulus and the Poisson's ratio of a perfectly isotropic material. If the material is elastically anisotropic, Equation 5 above must be transformed according to the stress-strain ratios of the anisotropic material. The stress energy in the adsorbate is quadratic with strain. As mentioned above, the strain of the adsorbate is proportional to the in-plane components of the strains of the plate at the point of adsorption, and therefore, a general expression of strain energy in the adsorbate is:

$$U_a = \gamma_x \varepsilon_{xx}(x_0, y_0)^2 + \gamma_y \varepsilon_{yy}(x_0, y_0)^2 + \gamma_{xxyy}\varepsilon_{xx}(x_0, y_0)\varepsilon_{yy}(x_0, y_0) + \gamma_{xy}\varepsilon_{xy}(x_0, y_0)^2 + \gamma_{xxxy}\varepsilon_{xx}(x_0, y_0)\varepsilon_{xy}(x_0, y_0) + \gamma_{yyxy}\varepsilon_{yy}(x_0, y_0)\varepsilon_{xy}(x_0, y_0), \tag{Eq. 6}$$

wherein coefficients γ are constants that depend on the mechanical properties and the geometry of the adsorbate and on the geometry of the plate. A key feature of Equation 6 is that coefficients γ are completely independent of the adsorption position and the vibration mode and are, therefore, excellent candidates for a precise identification of the adsorbate; in other words, they form a stiffness "fingerprint" of the adsorbate, which can be experimentally determined. However, given that these coefficients depend on the geometry of the adsorbate, in a general case, they will change if the orientation of the adsorbate is different with respect to the coordinate system in which the mode and, therefore, the strains are defined. Therefore, in order to univocally form said fingerprint for the adsorbate, the real orientation must be resolved. This can be done if the mentioned print is defined in a fixed reference system for the adsorbate (for example, a reference system such as the one shown in FIG. 1). This can be done, for example, by applying rotation to the stress tensor. The new coefficients γ' measured in the reference system of the plate are related to the unique set of coefficients γ defined in the reference system fixed for the adsorbate as follows:

$$\gamma'_x = \gamma_x \cos^4\theta + \gamma_y \sin^4\theta + (\gamma_{xy} + \gamma_{xxyy})\cos^2\theta \sin^2\theta - \gamma_{xxxy}\cos^3\theta \sin\theta - \gamma_{yyxy}\sin^3\theta \cos\theta$$

$$\gamma'_y = \gamma_y \cos^4\theta + \gamma_x \sin^4\theta + (\gamma_{xy} + \gamma_{xxyy})\cos^2\theta \sin^2\theta + \gamma_{xxxy}\cos^3\theta \sin\theta + \gamma_{yyxy}\sin^3\theta \cos\theta$$

$$\gamma'_{xy} = (\gamma_{xy} + \gamma_{xxyy})\cos^2 2\theta + (\gamma_x + \gamma_y)\sin^2 2\theta - \gamma_{xxxy} + (\gamma_{xxxy} - \gamma_{yyxy})\cos^2 2\theta \sin^2 2\theta$$

$$\gamma'_{xxyy} = 1/2(\gamma_x + \gamma_y - \gamma_{xy} - \gamma_{xxyy})\sin^2 2\theta + \gamma_{xxyy} + 1/2(\gamma_{xxxy} - \gamma_{yyxy})\cos^2 2\theta \sin^2 2\theta$$

$$\gamma'_{xxxy} = (\gamma_x - \gamma_y + (\gamma_x + \gamma_y - \gamma_{xy} - \gamma_{xxyy})\cos 2\theta)\sin 2\theta 1/2 ((\gamma_{xxxy} + \gamma_{yyxy})\cos 2\theta + (\gamma_{xxxy} - \gamma_{yyxy})\cos 4\theta)$$

$$\gamma'_{yyxy} = (\gamma_x - \gamma_y - (\gamma_x + \gamma_y - \gamma_{xy} - \gamma_{xxyy})\cos 2\theta)\sin 2\theta 1/2 ((\gamma_{xxxy} + \gamma_{yyxy})\cos 2\theta - (\gamma_{xxxy} - \gamma_{yyxy})\cos 4\theta), \tag{Eq. 7}$$

wherein θ is the angle between the two coordinate systems (see FIG. 1). The set of coefficients $\{\gamma_x, \gamma_y, \gamma_{xy}, \gamma_{xxyy}, \gamma_{xxxy}, \gamma_{yyxy}\}$ will thereby be used in the present invention as a unique fingerprint of the adsorbate. By studying Equation 7 above, some consequences can be deduced. For example, the projection of a regular adsorbate in the plate plane has two orthogonal lines of symmetry (that is a good approximation in the case of most the adsorbates of interest), and when said adsorbate is oriented at 45 degrees with respect to the coordinate system of the plate, two conditions, (i) $\gamma'_x = \gamma'_y$ and (ii) $\gamma'_{xxxy} = \gamma'_{yyxy}$, must be satisfied, and these conditions furthermore mean that $\gamma_{xxxy} = \gamma_{yyxy} = 0$. Therefore, for an adsorbate that is not extremely irregular, there are four unique parameters $\gamma_x$, $\gamma_y$, $\gamma_{xy}$ and $\gamma_{xxyy}$, which will allow the univocal identification thereof. Coefficients $\gamma_{xxxy}$ and $\gamma_{yyxy}$ are, in turn, indicative of the irregularity of the adsorbate. An even simpler case is when the adsorbate presents azimuthal symmetry around the z axis. In this case, Equation 7 must be independent of the angle of orientation and, in that case, $\gamma_x=\gamma_y$ and $\gamma_{xxyy}=2\gamma_x-\gamma_{xy}$, and the number of unique coefficients is reduced to two. It is then evident that amounts $(\gamma_x-\gamma_y)$ and $(2\gamma_x-\gamma_{xy}-\gamma_{xxyy})$ are coefficients indicative of the asymmetry of the adsorbate.

The present invention further allows the adsorption position, the mass, and the various stiffness coefficients of the adsorbate to be calculated from the relative changes in frequency of several vibration modes by means of numerical calculation. Nevertheless, the extraction of all the useful information about the changes in relative frequency of several vibration modes of a plate is not a task free of complex issues a priori, due to the large number of parameters involved in the problem. One problem with general optimization with a large amount of variables may involve, in any case, a high computational cost. However, there are some peculiarities that can be used in different preferred embodiments of the invention to simplify said optimization. It is important to note that the change in relative frequency presents a linear dependence on all the parameters of the problem, except the position coordinates $(x_0, y_0)$. This means that the position must be calculated with precision to avoid large uncertainties in the rest of the parameters. For the type of adsorbates typically of interest, the effect of mass is generally much greater than the effect of stiffness; therefore, a first good estimation of the adsorption position can be performed, disregarding the effect of stiffness. This greatly simplifies the optimization problem. Once this estimation has been performed, the stiffness parameters can subsequently be included as a small perturbation of the initial problem. The optimization problem is thereby transformed into smaller and simpler subproblems which can be solved sequentially. For this purpose, it is possible to define two vectors which will be used during the process:

$$\Phi_n = \left[ -d_n^2, \frac{\varepsilon_{xxn}^2}{2U_{pn}}, \frac{\varepsilon_{yyn}^2}{2U_{pn}}, \frac{\varepsilon_{xyn}^2}{2U_{pn}}, \frac{\varepsilon_{xxn}\varepsilon_{yyn}}{2U_{pn}}, \frac{\varepsilon_{xxn}\varepsilon_{xyn}}{2U_{pn}}, \frac{\varepsilon_{yyn}\varepsilon_{xyn}}{2U_{pn}} \right], \quad \text{(Eq. 8)}$$

$$\Delta = \left[ 1, \frac{2M_p \gamma_x'}{M_a}, \frac{2M_p \gamma_y'}{M_a}, \frac{2M_p \gamma_{xy}'}{M_a}, \frac{2M_p \gamma_{xxyy}'}{M_a}, \frac{2M_p \gamma_{xxxy}'}{M_a}, \frac{2M_p \gamma_{yyxy}'}{M_a} \right], \quad \text{(Eq. 9)}$$

wherein $d_n^2 = \hat{u}_n(x_0, y_0)^2 + \hat{v}_n(x_0, y_0)^2 + \hat{w}_n(x_0, y_0)^2$ is the square of the total displacement. $\Phi_n$, in turn, is a vector containing all the information about the n-th vibration mode and $\Delta$ is the vector containing the unknowns being sought and is completely independent of the vibration mode and the adsorption position.

For an example in which N modes in total are being measured and given that stiffness causes positive changes in frequency and mass causes negative changes in frequency, a good option for ensuring a precise estimation is to choose only those modes which experience a negative change in frequency. Where M is the set of said modes with a negative change in frequency, for calculating the adsorption position, the following function is minimized:

$$F_0 = \sum_{m \in M} \left( \frac{\delta f_m}{\sqrt{\sum_{k \in M} \delta f_k^2}} - \frac{\Phi_m^1 \Delta^1}{\sqrt{\sum_{k \in M} (\Phi_k^1 \Delta^1)^2}} \right)^2, \quad \text{(Eq. 10)}$$

wherein $\delta f_m$ is the displacement of the relative frequency of the experimentally measured m-th mode. Values $(x_0, y_0) \in \Omega$ minimizing function $F_0(x, y)$ are the first estimation of the adsorption position. It must be noted that the minimum number of modes necessary for this first estimation is three, and at least one must have a considerable variation along the x coordinate and another along the y coordinate in order to correctly solve $(x_0, y_0)$. The second step is to include the stiffness terms corresponding to strains x, y and xy. The other three terms (xxyy, xxxy, yyxy) are generally much smaller than these three and can be disregarded in this step. Next, the minimum around the previous calculated position $(x_0, y_0)$ is sought. The new function that must be minimized is:

$$F_1 = \sum_{n=1}^{N} \left( \frac{\delta f_n}{\sqrt{\sum_{k=1}^{N} \delta f_k^2}} - \frac{\sum_{i=1}^{4} \Phi_n^i \Delta^i}{\sqrt{\sum_{k=1}^{N} (\sum_{i=1}^{4} \Phi_k^i \Delta^i)^2}} \right)^2. \quad \text{(Eq. 11)}$$

The new values of position $(x_0, y_0)$ and the first calculation of $\Delta^i$ for $i=2, 3, 4$ are obtained from the minimization of Equation 11. In the next step, the rest of the stiffness terms can be included by simply increasing the sums in Equation 11, from $i=1$ to $i=5, 6$ and 7. It is important to mention that the entire method for obtaining all the components of $\Delta$ can be divided into sequential steps. For example, after the first estimation of the position, it is possible to use the modes in which, in that position, the main component of strain is component x. In that case, it is necessary to include only these vibration modes in Equation 11 and only terms $\Delta^1$ and $\Delta^2$. After this step, it is possible to include component y of stiffness, component xy and so on and so forth, always ensuring that the minimum value found for the function $F_1$ is lower than it is in the preceding step. The mass can be calculated using the mode having the greatest negative change in frequency. With q being said mode, the mass can be calculated as follows:

$$M_a = \frac{2M_p \delta f_q}{\sum_{i=1}^{7} \Phi_q^i \Delta^i}. \quad \text{(Eq. 12)}$$

A further application of the technique of the present invention in a preferred embodiment thereof is being able to identify particles with very high precision. When there is a set of objects, the distinguishing capacity of a given method grows together with the number of properties that the method can measure based on the elements of the set. The mass and all the different terms of stiffness make this technique a highly powerful tool for this task. For each particle of the set, there is defined a database with the values of $M_a$, $\gamma_x$, $\gamma_y$, $\gamma_{xy}$, $\gamma_{xxyy}$, $\gamma_{xxxy}$ and $\gamma_{yyxy}$ which will be necessary for being able to make a comparison between particles. However, the amounts experimentally obtained for making said comparison are $M_a$, $\gamma_x'$, $\gamma_{xy}'$, $\gamma_{xxyy}'$, $\gamma_{xxxy}'$ and $\gamma_{yyxy}'$. To make the comparison, Equations 6 is used with the values of the database, and the following function is formed:

$$I(\theta) = \sum_{n=1}^{N} \text{abs}(\Phi_n^1)(M_a^D - M_a)^2 + \sum_{i=2}^{7}\sum_{n=1}^{N} \text{abs}(\Phi_n^i)\left((\gamma_i')^D - \frac{M_a}{2M_p}\Delta^i\right)^2, \quad \text{(Eq. 13)}$$

wherein superscript D refers to the values of the database. Equation 13 has been weighted, giving more importance to those components having a higher value at the point of adsorption, in order to improve the success of the identification. Nevertheless, in other embodiments of the invention, other similarity estimators can likewise be used for the identification of the particles. The minimization of Equation 13 (or of the chosen similarity estimator, in each case) allows the angle of orientation for each particle of the set to be calculated, with the particle giving the minimum value of said equation being most likely the right particle.

Figure 2:
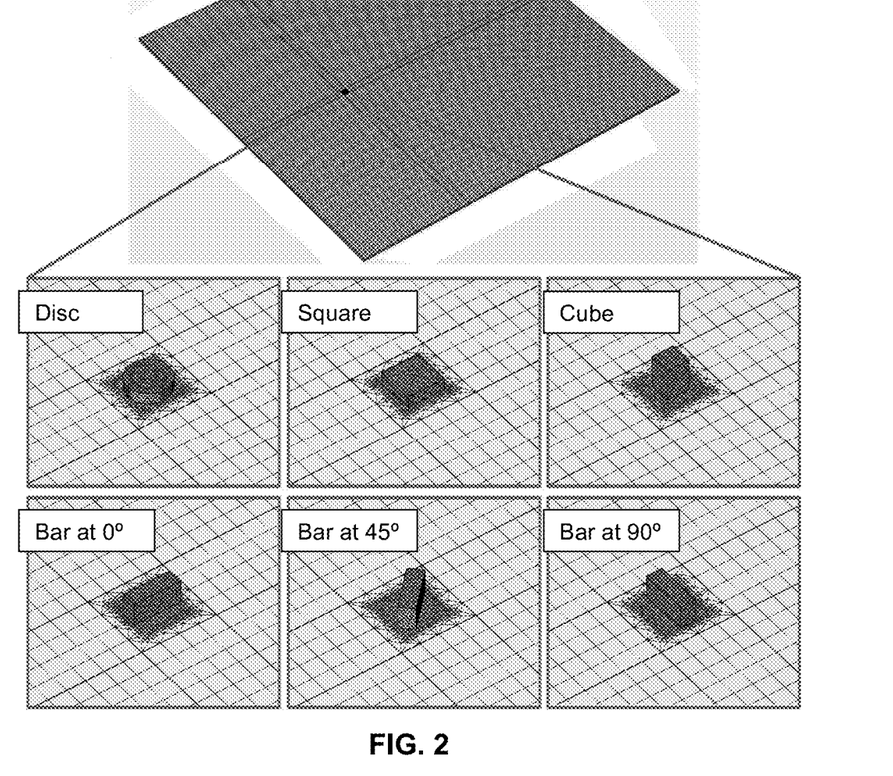
FIG. 2 shows geometries of the cantilever type plate and six different adsorbate configurations used for proof of concept of the method of the invention in a preferred embodiment thereof. The figure also depicts the mesh used for the numerical calculations of the corresponding FEM simulations.
Figure 3:
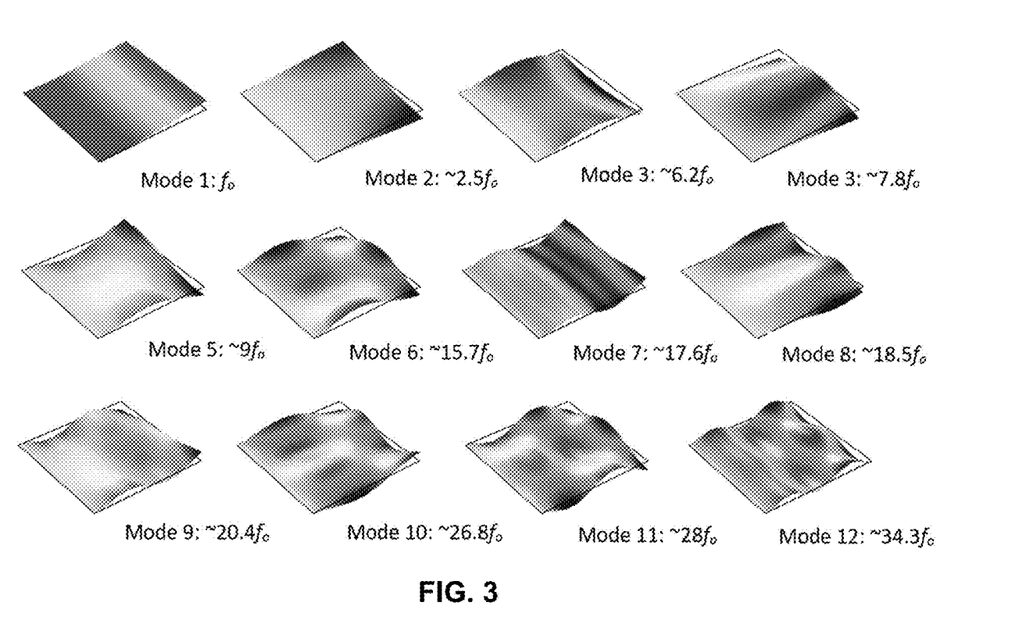
FIG. 3 shows finite element simulations of the first twelve out-of-plane vibration modes of the square-shaped cantilever type plate with a Poisson's ratio of 0.28, as well as the ratio of each frequency to the fundamental frequency of the plate.

As a non-limiting example of a preferred embodiment of the invention, the process of identifying four particles with the same mass, the same Young's modulus, the same volume but a different shape, using out-of-plane vibrations of a cantilever type square plate is illustrated next. In said example, finite element simulations of a plate with said shape and the adsorption of four particles with different shapes, that is, a disc, a square, a cube, and a bar with three different orientations (see FIG. 2, in which the different situations are depicted) have been performed. All the particles have a density of 1000 kg/m³, a Young's modulus of 5 GPa, Poisson's ratio of 0.25 and a volume of 0.025 μm³. The cantilever type plate used is made of silicon with a side measuring 50 μm and a thickness of 200 nm. Due to the similarity of the four particles, the identification presents high complexity, therefore the first twelve out-of-plane modes are used for the calculations (see the representation of said modes in FIG. 3). For other cases in which the particles to be identified are not as similar, the number of modes necessary for having precise predictions would be, in principle, lower. In turn, the x axis perpendicular to the fixed edge thereof, with an origin at the anchored edge and through the central axis of the plate, is chosen for the square cantilever type plate. As mentioned, FIG. 3 shows the first twelve out-of-plane modes of the plate, calculated by finite element simulations for a material with a Poisson's ratio of 0.28.

For this type of vibration modes, the only relevant displacement is $\hat{w}(x_0, y_0)$ and the strains in the adsorption position are proportional to the curvatures of the plate:

$$\varepsilon_{xx}(x_0, y_0) = -\frac{h}{2}\frac{\partial^2 w(x_0, y_0)}{\partial x^2};$$

$$\varepsilon_{yy}(x_0, y_0) = -\frac{h}{2}\frac{\partial^2 w(x_0, y_0)}{\partial y^2}; \quad \text{(Eq. 14)}$$

$$\varepsilon_{xy}(x_0, y_0) = -\frac{h}{2}\frac{\partial^2 w(x_0, y_0)}{\partial x \partial y},$$

wherein h is the thickness of the plate. For all the proposed particles, coefficients $\gamma_{xxxy}$ and $\gamma_{yyxy}$ are zero and will therefore have only four stiffness parameters. For greater convenience, parameters γ are defined such that the change in relative frequency due to stiffness, when the orientation is zero, is defined by the expression:

$$\left(\frac{\Delta f_n}{f_{0n}}\right)_S = \frac{K}{\Lambda_n^4}\left[\gamma_x\left(\frac{\partial^2 \hat{w}_n(x_0, y_0)}{\partial x^2}\right)^2 + \gamma_y\left(\frac{\partial^2 \hat{w}_n(x_0, y_0)}{\partial y^2}\right)^2 + \gamma_{xy}\left(\frac{\partial^2 \hat{w}_n(x_0, y_0)}{\partial x \partial y}\right)^2 + \gamma_{xxyy}\frac{\partial^2 \hat{w}_n(x_0, y_0)}{\partial x^2}\frac{\partial^2 \hat{w}_n(x_0, y_0)}{\partial y^2}\right], \quad \text{(Eq. 15)}$$

wherein $$K = \frac{E_a V_a(1-\nu_p^2)}{2E_p V_p}$$

and $\Lambda_n$ is a numaer dependent on the mode coming from integration into Equation 5. Prior to the test simulations, the four stiffness coefficients $K\gamma_x$, $K\gamma_y$, $K\gamma_{xy}$, and $K\gamma_{xxyy}$ have been calculated by means of finite element simulations (FEM) for the four particles in order to complete the database represented in Table 1 below:

TABLE 1

Parameters of the database obtained by FEM for the four particles used for the identification test.

| Particle | $M_a/2M_c$(ppm) | $K\gamma_x$(ppm) | $K\gamma_y$(ppm) | $K\gamma_{xy}$(ppm) | $K\gamma_{xxyy}$(ppm) |
|---|---|---|---|---|---|
| Disc | 10.7342 | 2.6144 | 2.6144 | 4.4922 | 0.7367 |
| Square | 10.7342 | 2.6509 | 2.6509 | 4.3671 | 0.7182 |
| Cube | 10.7342 | 0.6339 | 0.6339 | 1.5262 | 0.0778 |
| Bar | 10.7342 | 3.0169 | 0.5112 | 2.0858 | 0.1317 |

The identification test therefore consists of calculating the change in relative frequency of the twelve vibration modes due to the adsorption of each of the particles by means of finite element simulations. The obtained values are used for calculating all the parameters by applying the inverse problem. Then, by using the database shown in Table 1, the identification algorithm described above is applied in order to identify the corresponding particle. This method is applied for the six different particle configurations and by varying the adsorption position on the entire surface of the plate.

Figure 4:
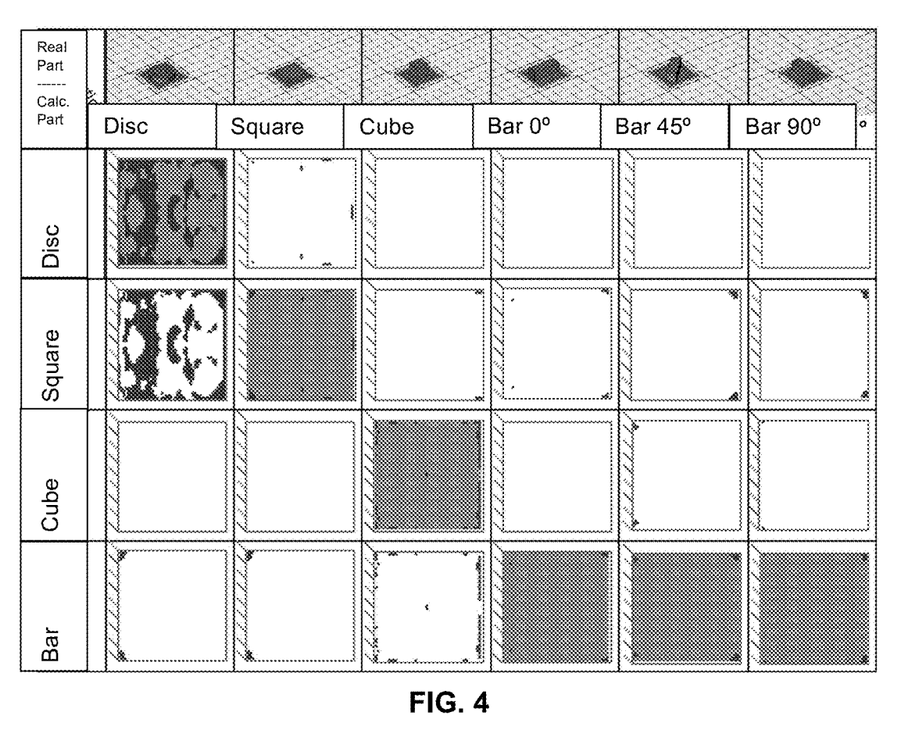
FIG. 4 shows results of the identifications obtained after applying the method for identification of the invention, according to a preferred embodiment thereof, based on the adsorption position. The darkest regions represent the positions where the identification is incorrect, and the lightest regions represent the positions where the identification is successful. It can be seen can that for square, cube and bar shapes, the identification is correct for almost the entire plate, but in positions very close to the corners or edges of the plate, the identification presents errors. For the case of the disc, the successful identification area is not as successful as for the other particles due to the high similarity between disc and square stiffness parameters.

The identification success by applying the method of the invention is represented in FIG. 4. The percentage of identification success is 60.5%, 98.4%, 96.3%, 99.5%, 98.7% and 99.3% for the disc, square, cube, bar at 0 degrees, bar at 45 degrees and bar at 90 degrees, respectively. Except in the case of the disc, the small percentage missing from the rest of the cases corresponds to the points of adsorption where stiffness resolution is poor, mostly the corners and edges of the plate. If the mass of the particles is not the same, the points close to the free corners and edges would also have a highly successful identification. The two corners at the secured end of the plate are fairly critical because at these points, only component x of stiffness is large enough to be measured with precision and, in this case, with a similar group of particles, the identification with a single parameter cannot be performed. In the case of the disc, the percentage of success is lower than in the rest of the particles. This is due to the extreme similarity between the disc and the square, as can be seen in Table 1. Almost all the points missing for the disc are due to the incorrect identification of a square (38.8%). The fact that the stiffness coefficients of the square are not entirely axisymmetric (they have a small dependence on the angle of orientation) leads to a small variation with the angle of orientation, and the disc can be easily confused with a square with an orientation of 45 degrees.

In conclusion, the present invention proposes a novel technique for the identification and classification of particles with extremely high precision based on the changes in relative frequency experienced by the vibrations of plates when these particles are adsorbed on their surface. Due to the special features that these resonant structures have, it is possible to distinguish particles with the same mass and Young's modulus, but with a different shape, which is not possible with the methods known in this field. The invention therefore constitutes an important breakthrough for the field of nanomechanical spectrometry, which can have relevant applications such as the identification and classification of viruses, bacteria, or particulate matter, considerably improving the distinguishing capacity of methods in the state of the art.

The invention claimed is:

1. A method determinging a mass $M_a$ and a shape if an adsorbate deposited on a resonating plate of mass $M_p$, and a relative geometrical orientation of the adsorbate with respect to the resonating plate in a three-dimensional space, wherein the resonance of said plate is parametrized by a set of vibration modes, and wherein, for each of said modes, the corresponding resonance frequency $f_0$ thereof is displaced by a certain amount $\Delta f$ upon depositing the adsorbate in an adsorption position $(x_0, y_0)$ thereof, said method comprising the following steps:

depositing the adsorbate on the resonating plate;

measuring the change in frequency $\Delta f$ of the plurality of vibrations modes of the resonating plan upon depositing the adsorbate in an adsorption position $(x_0, y_0)$ thereof;

performing, in a processing unit of a computer, the following steps:

calculating a first estimation of the adsorption position $(x_0, y_0)$ and a first estimation of the adsorbate mass $M_a$ from the measurement of the change in frequency $\Delta f$ of the plurality of vibration modes of the resonating plate, with prior knowledge of the mass of the resonating plate $M_p$, the effect of the stiffness being disregarded, such that the change $\Delta f$ is determined as follows:

$$\frac{\Delta f}{f_0} = -\frac{1}{2}\frac{M_a}{M_p}(\hat{u}(x_0, y_0)^2 + \hat{v}(x_0, y_0)^2 + \hat{w}(x_0, y_0)^2);$$

wherein $\hat{u}$ and $\hat{v}$ are dimensionless displacements along a system of axes in-plane of the resonating plate, and $\hat{w}$ is the dimensionless displacement along an axis perpendicular to the plane of the plate;

using the first estimations of the absorption position $(x_0, y_0)$ and the adsorbate mass $M_a$ as a starting point for calculating the adsorption position, the adsorbate mass $M'_a$ and a plurality of stiffness coefficients $\gamma'$ dependent on the mechanical properties and geometry of the adsorbate and on the geometry of the plate from the measurement of the change in frequency $\Delta f$ of the plurality of vibration modes of the resonating plate, and using the strain energy $U_a$ of the adsorbate based on the strain tensor in the adsorption position, $\varepsilon_{xx,yy,xy}(x_0, y_0)$, obtained from the displacement $(\hat{u}, \hat{v}, \hat{w})$ in-plane $(x, y)$ defined by the plate for a subset of resonant modes, as follows:

$U_a = \gamma'_x \varepsilon_{xx}(x_0, y_0)^2 + \gamma'_y \varepsilon_{yy}(x_0, y_0)^2 + \gamma'_{xxyy}\varepsilon_{xx}(x_0, y_0)\varepsilon_{yy}(x_0, y_0) + \gamma'_{xy}\varepsilon_{xy}(x_0, y_0)^2 + \gamma'_{xxxy}\varepsilon_{xx}(x_0, y_0)\varepsilon_{xy}(x_0, y_0) + \gamma'_{yyxy}\varepsilon_{yy}(x_0, y_0)\varepsilon_{xy}(x_0, y_0)$;

comparing the values of the adsorbate mass $M'_a$ and of the coefficients $\gamma'$ calculated in the preceding step with a set of reference values $\{M_a^D, (\gamma')^D\}$ which are calculated from the transformation to the reference system of the resonating plate of previously stored values corresponding to a catalogue of known adsorbates deposited on the plate with a given orientation in a reference plane $(x', y')$ with respect to a reference system fixed for the adsorbate; and identifying the adsorbate deposited on the resonating plate as the adsorbate belonging to the catalogue the values $M'_a$ and $\gamma'$ of which are the most similar to the values $\{M_a^D, (\gamma')^D\}$.

2. A computer program product, in the form of a non-transitory computer-readable medium having stored thereon computer-readable instructions that when executed by a computing device cause the computing device to perform operations comprising the method according to claim 1.

3. The method according to claim 1, wherein the components $\gamma'$ measured in the reference system of the plate are related to the components $\gamma$ measured in the reference system of the adsorbate belonging to the catalogue of adsorbates, which is rotated an angle $\theta$ about the z axis, by means of the expression:

$\gamma'_x = \gamma_x \cos^4\theta + \gamma_y \sin^4\theta + (\gamma_{xy}+\gamma_{xxyy})\cos^2\theta \sin^2\theta - \gamma_{xxxy}\cos^3\theta \sin\theta - \gamma_{yyxy}\sin^3\theta \cos\theta$ $\gamma'_y = \gamma_y \cos^4\theta + \gamma_x \sin^4\theta + (\gamma_{xy}+\gamma_{xxyy})\cos^2\theta \sin^2\theta + \gamma_{xxxy}\cos^3\theta \sin\theta + \gamma_{yyxy}\sin^3\theta \cos\theta$ $\gamma'_{xy} = (\gamma_{xy}+\gamma_{xxyy})\cos^22\theta + (\gamma_x+\gamma_y)\sin^22\theta - \gamma_{xxxy}+(\gamma_{xxxy}-\gamma_{yyxy})\cos^22\theta \sin^22\theta$ $\gamma'_{xxyy} = 1/2(\gamma_x+\gamma_y-\gamma_{xy}-\gamma_{xxyy})\sin^22\theta + \gamma_{xxyy}+1/2(\gamma_{xxxy}-\gamma_{yyxy})\cos^22\theta \sin^22\theta$ $\gamma'_{xxxy} = (\gamma_x-\gamma_y+(\gamma_x+\gamma_y-\gamma_{xy}-\gamma_{xxyy})\cos 2\theta)\sin 2\theta + 1/2((\gamma_{xxxy}+\gamma_{yyxy})\cos 2\theta+(\gamma_{xxxy}-\gamma_{yyxy})\cos 4\theta)$ $\gamma'_{yyxy} = (\gamma_x-\gamma_y-(\gamma_x+\gamma_y-\gamma_{xy}-\gamma_{xxyy})\cos 2\theta)\sin 2\theta + 1/2((\gamma_{xxxy}+\gamma_{yyxy})\cos 2\theta-(\gamma_{xxxy}-\gamma_{yyxy})\cos 4\theta)$.

4. The method according to claim 3, wherein the resonant vibration modes comprise out-of-plane and/or in-plane vibration modes.

5. The method according to claim 1, wherein only resonant vibration modes experiencing a negative change in frequency with the deposition of the adsorbate are selected.

6. The method according to claim 5, wherein N>2 modes in total are measured, and M is the set of said modes with a negative change in frequency and wherein, for calculating the adsorption position in the first step, the following function is minimized:

$$F_0 = \sum\nolimits_{m \in M}\left(\frac{\delta f_m}{\sqrt{\sum_{k \in M}\delta f_k^2}} - \frac{\Phi_m^1 \Delta^1}{\sqrt{\sum_{k \in M}(\Phi_k^1 \Delta^1)^2}}\right)^2,$$

wherein $\delta f_m$ is the displacement of the relative frequency of the experimentally measured m-th mode, and wherein:

$$\Phi_n = \left[ -d_n^2, \frac{\varepsilon_{xxn}^2}{2U_{pn}}, \frac{\varepsilon_{yyn}^2}{2U_{pn}}, \frac{\varepsilon_{xyn}^2}{2U_{pn}}, \frac{\varepsilon_{xxn}\varepsilon_{yyn}}{2U_{pn}}, \frac{\varepsilon_{xxn}\varepsilon_{xyn}}{2U_{pn}}, \frac{\varepsilon_{yyn}\varepsilon_{xyn}}{2U_{pn}} \right],$$

$$\Delta = \left[ 1, \frac{2M_p\gamma'_x}{M_a}, \frac{2M_p\gamma'_y}{M_a}, \frac{2M_p\gamma'_{xy}}{M_a}, \frac{2M_p\gamma'_{xxyy}}{M_a}, \frac{2M_p\gamma'_{xxxy}}{M_a}, \frac{2M_p\gamma'_{yyxy}}{M_a} \right],$$

$d_n^2 = \hat{u}_n(x_0, y_0)^2 + \hat{v}_n(x_0, y_0)^2 + \hat{w}_n(x_0, y_0)^2$ is the square of the total displacement of the plate, and values $(x_0, y_0) \in \Omega$ minimizing function $F_0(x, y)$ are the first estimation of the adsorption position.

7. The method according to claim 6, wherein for calculating the final adsorption position, the mass $M'_a$ and the different coefficients $\gamma'$, the following function is minimized:

$$F_1 = \sum_{n=1}^{N} \left( \frac{\delta f_n}{\sqrt{\sum_{k=1}^{N} \delta f_k^2}} - \frac{\sum_{i=1}^{7} \Phi_n^i \Delta^i}{\sqrt{\sum_{k=1}^{N} (\sum_{i=1}^{7} \Phi_k^i \Delta^i)^2}} \right)^2.$$

8. The method according to claim 1, wherein the comparison of the values of the candidate mass of the adsorbate $M_a$ and of the coefficients $\gamma'$ with the set of previously stored reference values $\{M_a^D, (\gamma')^D\}$ is calculated by means of the similarity estimator $I(\theta)$:

$$I(\theta) = \sum_{n=1}^{N} \text{abs}(\Phi_n^1)(M_a^D - M_a)^2 + \sum_{i=2}^{7} \sum_{n=1}^{N} \text{abs}(\Phi_n^i)\left( (\gamma'_i)^D - \frac{M_a}{2M_p}\Delta^i \right)^2,$$

wherein superscript D refers to the values of the catalogue of adsorbates, and wherein value $\theta$ minimizing $I(\theta)$ is the most likely value of the orientation of the adsorbate.

9. The method according to claim 1, wherein the adsorbates are inorganic particles, viruses, bacteria, proteins and/or cells.

10. The method according to claim 1, wherein in the step corresponding to the calculation of the final values of mass $M'_a$, of the position of the adsorbate and of the plurality of stiffness coefficients $\gamma'$, the effect of stiffness is taken into account by means of a perturbation method with respect to the initial identification.

11. A system for identifying an adsorbate of mass $M_a$ deposited on a resonating plate of mass $M_p$, wherein the resonance said plate is parametrized by a plurality of vibration modes and wherein, for each of said vibration modes, the corresponding resonance frequency $f_0$ thereof is displaced by an amount $\Delta f$ based on the non-dimensional displacement $(\hat{u}, \hat{v}, \hat{w})$ of the plate in the corresponding vibration mode upon depositing the adsorbate in an adsorption position $(x_0, y_0)$ thereof, wherein said system comprises:

one or more resonating plates configured for the deposition of one or more adsorbates;

a sensor configured for measuring the displacement of the resonance frequency when the adsorbate is deposited on one of the resonating plates for a plurality of vibration modes thereof;

a processing unit of a computer configured for reading the data generated by the sensor and storing a set of reference values $\{M_a, \gamma\}$, corresponding to a catalogue of known adsorbates deposited on the resonating plate with a given orientation in a reference plane (x', y'), and further configured for performing a method according to claim 1.

12. The system according to claim 11, wherein said system comprises a mass spectrometer.

13. The system according to claim 12, further comprising one or more vacuum chambers and an ionization and/or electrospray system suitable for spraying adsorbates on the plates.

14. The system according to claim 11, wherein the sensor for measuring the displacement of the resonance frequency comprise piezoelectric materials for performing frequency scanning and/or one or more phase-locked loops; and one or more lasers focused on the resonating plates and configured for emitting a beam thereon.

15. The system according to claim 14, further comprising a photodetector suitable for receiving the laser beam reflected by the plates.

16. The system according to claim 15, comprising an amplifier connected to the photodetector and suitable for subsequently amplifying the signal for reading same.

* * * * *

UNITED STATES PATENT AND TRADEMARK OFFICE
CERTIFICATE OF CORRECTION

| | | |
|---|---|---|
| PATENT NO. | : 12,140,521 B2 | Page 1 of 1 |
| APPLICATION NO. | : 17/427331 | |
| DATED | : November 12, 2024 | |
| INVENTOR(S) | : José Jaime Ruz Martínez et al. | |

It is certified that error appears in the above-identified patent and that said Letters Patent is hereby corrected as shown below:

In the Claims

Column 13, Claim 1, Line 21, "if" should be --of--.

Column 13, Claim 1, Line 54, after "of the" insert --resonating--.

Column 16, Claim 11, Line 7, after "resonance" insert --of--.

Signed and Sealed this
Twenty-fifth Day of March, 2025

Coke Morgan Stewart
*Acting Director of the United States Patent and Trademark Office*